Jan. 30, 1968 MICHIO KURUSU 3,366,884

RADIO FREQUENCY NOISE ELIMINATING CIRCUIT

Filed July 16, 1965 2 Sheets-Sheet 2

United States Patent Office 3,366,884

Patented Jan. 30, 1968

3,366,884

RADIO FREQUENCY NOISE ELIMINATING CIRCUIT

Michio Kurusu, Kawasaki-shi, Japan, assignor to Fujitsu Limited, Kawasaki, Japan, a corporation of Japan Filed July 16, 1965, Ser. No. 472,500
Claims priority, application Japan, July 30, 1964, 39/43,265
6 Claims. (Cl. 325—478)

The present invention relates to a radio frequency noise eliminating circuit. More particularly, the invention relates to a radio receiver circuit for eliminating radio frequency noise.

In a radio receiver supported in a motor vehicle, noise pulses generated by the engine of the vehicle are often several tens of decibels greater in level than the received signal and often make it impossible to properly reproduce a received signal.

The principal object of the present invention is to provide a new and improved radio frequency noise eliminating circuit.

In accordance with the present invention a noise elimination circuit is connected between the high frequency and first intermediate frequency and noise frequency circuits and the audio frequency circuit of a radio receiver and produces from the first intermediate frequency signal and supplies to the audio frequency circuit a second intermediate frequency signal when the noise signal is of zero magnitude and prevents the supply of a signal to the audio frequency circuit when the noise signal has a detectable magnitude. The noise elimination circuit comprises a mixer for mixing the output signal of the local oscillator with the first intermediate frequency signal to produce a second intermediate frequency signal in its operative condition and to produce a zero signal in its inoperative condition and a gate connected to the noise frequency circuit and cooperating with the mixer and the local oscillator for permitting the mixer to be switched to its inoperative condition when a noise signal of detectable magnitude is supplied to the gate thereby preventing the supply of a signal to the audio frequency circuit and for permitting the mixer to be switched to its inoperative condition when a noise signal of zero magnitude is supplied to the gate thereby providing a second intermediate frequency signal to the audio frequency circuit.

In order that the present invention may be readily carried into effect, it will now be described with reference to the accompanying drawings, wherein.

In the figures the same components are identified by the same reference numerals.

Figure 1:
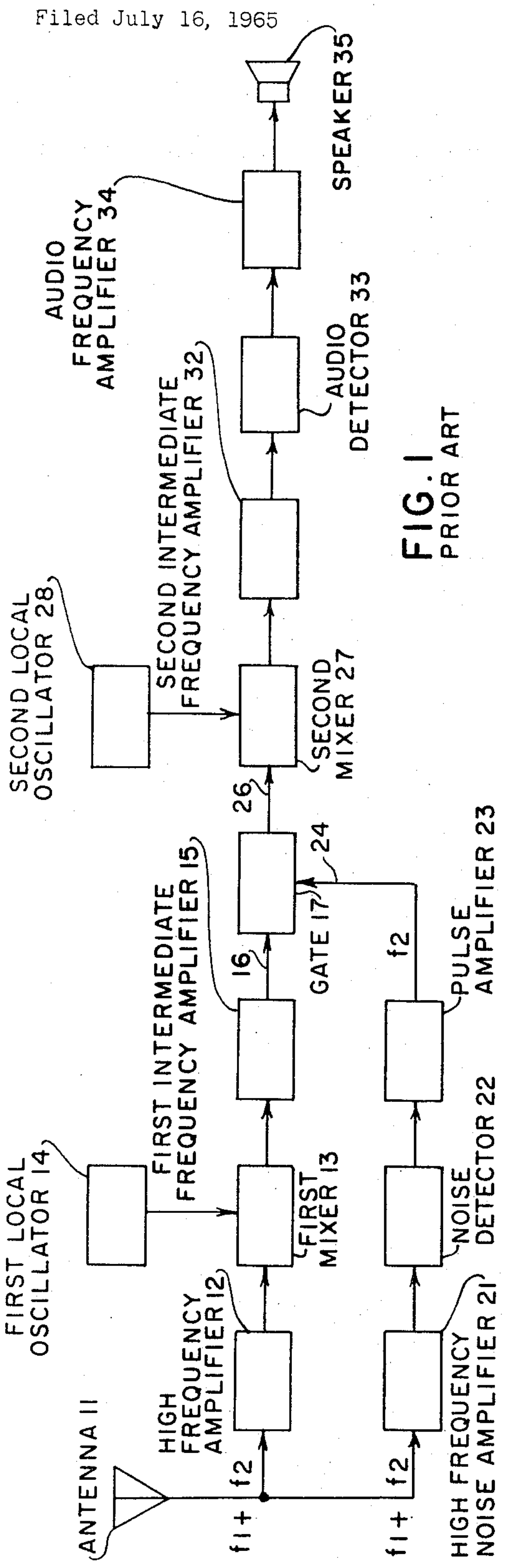
FIG. 1 PRIOR ART
FIG. 1 is a block diagram of an embodiment of a radio receiver including a radio frequency noise eliminating circuit of the prior art.
Figure 2:
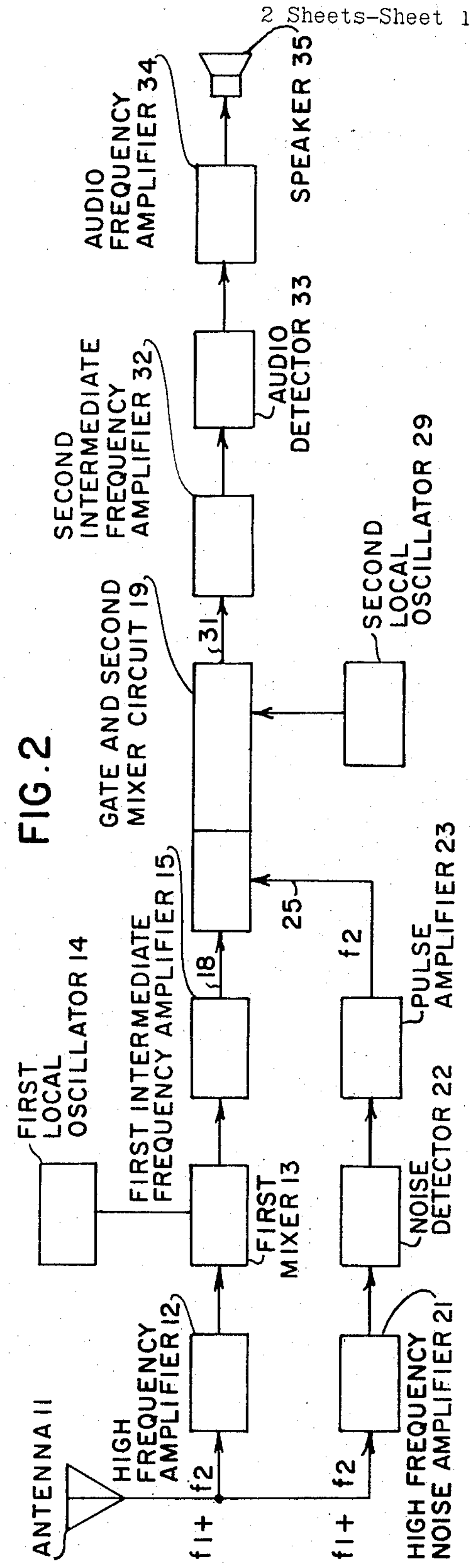
FIG. 2 is a block diagram of an embodiment of a radio receiver including the radio frequency noise eliminating circuit of the present invention.

FIG. 2, which is a block diagram of an embodiment of a radio receiver including the radio frequency noise eliminating circuit of the present invention, is identical with FIG. 1, which is a block diagram of an embodiment of a radio receiver including a radio frequency noise eliminating circuit of the prior art, except for the gate and second mixer circuit of FIG. 2 which constitutes the noise eliminating circuit of the present invention and which replaces the gate and the second mixer of FIG. 1.

In FIGS. 1 and 2, a high frequency or radio frequency signal received by an antenna 11 is amplified by a high frequency amplifier 12 and is mixed in a first mixer 13 with the signal from a first local oscillator 14 to produce the first intermediate frequency signal. The first intermediate frequency signal produced by the first mixer 13 is amplified by a first intermediate frequency amplifier 15 and is supplied to a first input 16 of a gate 17 in the radio receiver of FIG. 1 and to a first input 18 of a gate and second mixer circuit 19 which constitutes the noise eliminating circuit of the present invention, in the radio receiver of FIG. 2.

If a noise signal or pulse is present in the received signal, although such noise signal remains in the signal supplied to the first input 16 of the gate 17 of the radio receiver of FIG. 1 and in the signal supplied to the first input 18 of the gate and second mixer circuit 19 of the radio receiver of FIG. 2, the noise signal itself is amplified separately in a high frequency noise amplifier 21 after the radio signal is received by the antenna 11. The amplified noise signal is detected in a noise detector 22 which separates out the noise signal or pulse and the noise signal or pulse is then amplified in a pulse amplifier 23. The amplified noise pulse from the pulse amplifier 23 is supplied to a second input 24 of the gate 17 in the radio receiver of FIG. 1 and to a second input 25 of the gate and second mixer circuit 19 of the radio receiver of FIG. 2.

In the radio receiver of FIG. 1, the gated signal from the first intermediate frequency amplifier 15 is supplied via an output 26 of the gate 17 to a second mixer 27 where it is mixed with the signal from a second local oscillator 28 to produce the second intermediate frequency signal. In the radio receiver of FIG. 2, the gated signal from the first intermediate frequency amplifier 15 is mixed with the signal from a second local oscillator 29 in the gate and second mixer circuit 19 to produce the second intermediate frequency signal at an output 31 of said gate and second mixer circuit 19.

In FIGS. 1 and 2, the second intermediate frequency signal is amplified in a second intermediate frequency amplifier 32 and the audio signal is separated out in an audio detector 33 to which the amplified second intermediate frequency signal is supplied. The audio signal is then amplified in an audio frequency amplifier 34 which supplies the audio signal to a speaker 35 which reproduces the audio signal audibly. Each of the components 11, 12, 13, 14, 15, 21, 22, 23, 32, 33, 34 and 35 of each of FIGS. 1 and 2 may comprise any suitable means known in the art for providing the indication operation, as may each of the components 17, 27 and 28 of FIG. 1 and 29 of of FIG. 2.

In the prior art radio receiver of FIG. 1, when a noise signal is detected by the noise detector 22 and supplied to the second input 24 of the gate 17, it switches said gate to its blocking condition and thereby prevents the received radio signal including the then-present noise from reaching the second mixer 27. Thus, the speaker 35 of the radio recever of FIG. 1 produces no output when noise is detected in the radio signal supplied to the high frequency amplifier 12.

The radio frequency noise eliminating circuit arrangement of the present invention combines the functions of the gate 17 and the second mixer 27 of the radio receiver of FIG. 1 in a novel manner. Thus, in the radio receiver of FIG. 2, when a noise signal is detected by the noise detector 22 and supplied to the second input 25 of the gate and second mixer circuit 19 of the present invention, it switches said gate and second mixer circuit to its blocking condition and thereby prevents the received radio signal including the then-present noise from reaching the second intermediate frequency amplifier 32. Thus, the speaker 35 of the radio receiver of FIG. 2 produces no output when noise is detected in the radio signal supplied to the high frequency amplifier 12.

In the prior art radio receiver of FIG. 1, when there is no noise in the first intermediate frequency signal supplied to the gate 17, there is no noise signal supplied to the second input 24 of said gate and the received radio signal is supplied to the second mixer 27 and is reproduced as sound by the speaker 35. In the radio receiver of FIG. 2, when there is no noise in the first intermediate frequency signal supplied to the gate and second mixer circuit 19, there is no noise signal supplied to the second input 25 of said gate and second mixer circuit and the received radio signal is supplied to the second intermediate frequency amplifier 32 and is reproduced as sound by the speaker 35.

Figure 3:
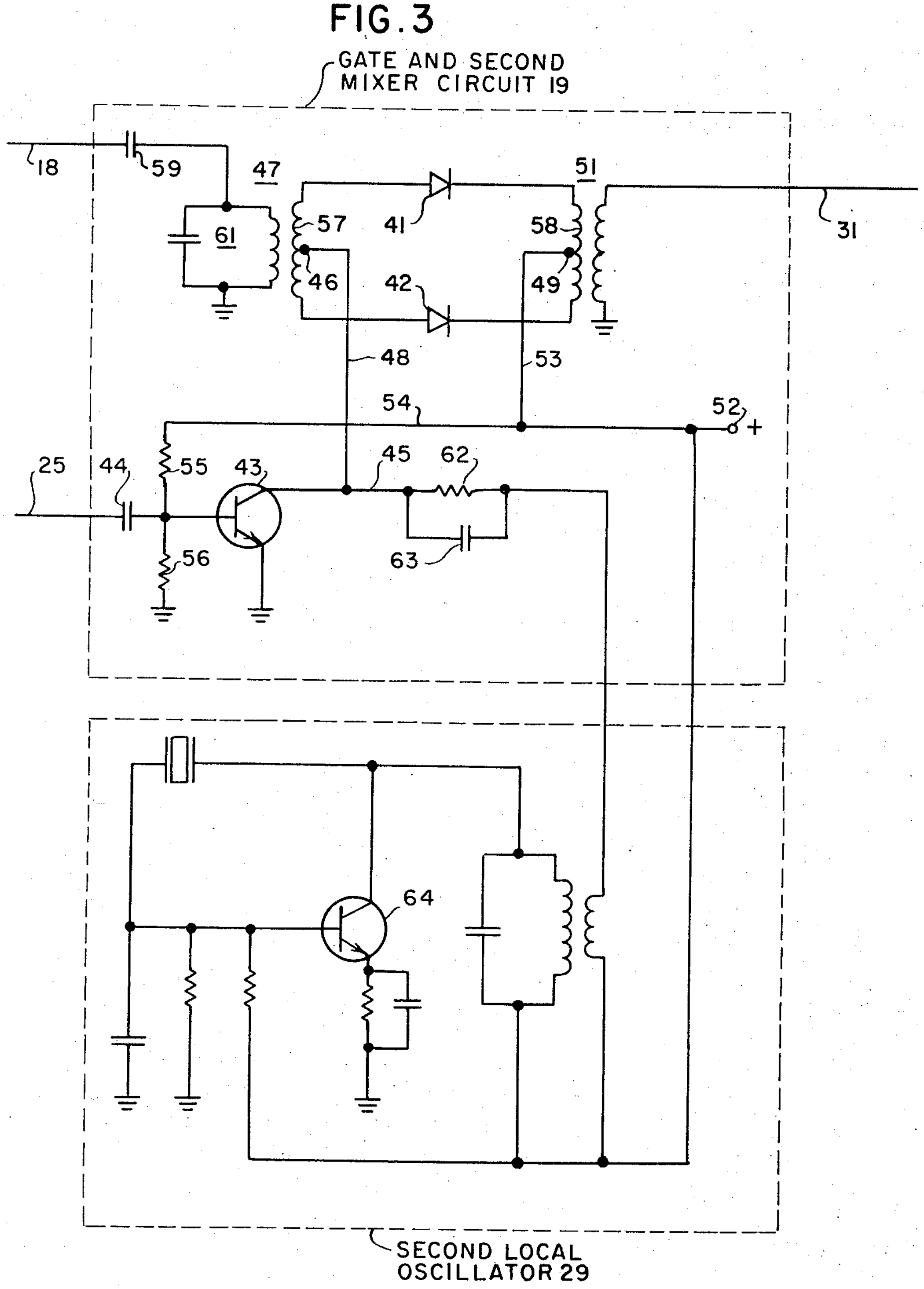
FIG. 3 is a circuit diagram of an embodiment of the radio frequency noise eliminating circuit of the present invention.

FIG. 3 is a circuit diagram of an embodiment of the radio frequency noise eliminating circuit of the present invention and includes a circuit diagram of the known second local oscillator 29. In FIG. 3, two diodes 41 and 42 function as a balanced mixer when there is no noise signal. When a noise signal is present, however, the diodes 41 and 42 are biased to their blocking condition and do not function as a mixer.

If a noise signal is present in the circuit, the noise signal of frequency *f*2 and the radio signal including the noise signal of frequency *f*1 plus *f*2, are supplied to the second input 25 and the first input 18, respectively, of the gate and second mixer circuit 19 of the present invention. The noise signal supplied to the second input 25 of the gate and second mixer circuit 19 is supplied to the base of a transistor 43 via a coupling capacitor 44. The transistor 43 is of NPN type and is connected in grounded emitter configuration. The noise signal supplied to the base of the transistor 43 makes the collector of said transistor more positive than the base by the output signal of the oscillator 29, which is supplied to said collector, and the said transistor is switched to its conductive condition.

When there is no noise signal, the output signal of the oscillator 29 is supplied to the collector of the transistor 43 via an output lead 45 which is connected to the center top 46 of an input transformer 47 of the mixer circuit comprising the diodes 41 and 42 via a lead 48. The center top 49 of an output transformer 51 of the mixer circuit is connected to a source 52 of positive voltage via a lead 53. Positive bias voltage is applied to the base of the transistor 43 from the source 52 via a lead 54 and a base resistor 55. The base of the transistor 43 is grounded via a resistor 56.

When there is no noise signal, the output signal of the oscillator 29 biases the diodes 41 and 42 to their conductive condition by applying a positive voltage to the anodes of said diodes, which positive voltage is more positive than the postive voltage from the source 52. The anode of the diode 41 is connected to the upper end terminal of the secondary winding 57 of the input transformer 47 and the anode of the diode 42 is connected to the lower end terminal of said secondary winding. The cathode of the diode 41 is connected to the upper end terminal of the primary winding 58 of the output transformer 51 and the cathode of the diode 42 is connected to the lower end terminal of said primary winding.

When there is no noise signal supplied to the base of the transistor 43 via the second input 25, said transistor is in its non-conductive condition and the output signal of the oscillator 29 is supplied via the leads 45 and 48 to the secondary winding 57 of the mixer circuit input transformer 47 and biases the diodes 41 and 42 to their conductive condition. The diodes 41 and 42 thus function as a mixer circuit to mix the output signal of the oscillator 29 with the first intermediate frequency signal supplied to the input transformer 47 via the first input 18, coupling capacitor 59 and tank circuit 61. The second intermediate frequency signal thus produced by the noise elimination circuit 19 of the present invention is supplied to the second intermediate frequency amplifier 32 via the output transformer 51 and the output 31.

When there is a noise signal supplied to the base of the transistor 43 via the second input 25, said transistor is switched to its conductive condition and the output signal of the oscillator 29 is conducted to ground via the lead 45 and the said transistor. The diodes 41 and 42 are biased to their blocking or non-conductive condition by the positive voltage applied to their cathodes from the source 52 via the leads 54 and 53 and the primary winding 58 of the output transformer 51. There is thus no mixing of signals by the mixer circuit and there is no output signal produced at the output transformer 51.

In an operative embodiment of the noise elimination circuit 19 of the present invention, the output signal or pulse of the oscillator 29 is given a width of about 10 microseconds by an RC circuit 62, 63 connected in the lead 45 and the width of the noise signal or pulse supplied to the base of the transistor 43 is about 1 microsecond. The second local oscillator 29 may comprise any suitable oscillator circuit known in the art. The oscillator 29 is shown in circuit form in FIG. 3 for illustrative purposes. The circuit illustrated for the oscillator 29 may comprise, for example, a crystal-controlled transistor oscillator utilizing a transistor 64 connected in ground emitter configuration.

The amplification frequency band of the high frequency noise amplifier 21 is wider than the amplification frequency band of the high frequency amplifier 12 in the radio receiver of FIG. 2 and said high frequency noise amplifier is devoid of delay. This enables the transmission of a noise signal or pulse without loss to the second input 25 of the gate and second mixer circuit 19 of the present invention, although the noise signal or pulse has a wide frequency band. The transmission of the noise pulses to the second input 25 of the gate and second mixer circuit 19 without loss insures the proper switching of the transistor 43.

The noise eliminating circuit of the present invention thus combines the gate and second mixer operation and is considerably more simple and inexpensive than prior art noise eliminating circuits since it utilizes considerably fewer components than such prior art circuits.

Since the noise signal in the signal having a frequency $f1+f2$ in the radio receiver circuit of FIG. 2 reaches the gate and second mixer circuit 19, via the first intermediate frequency amplifier 15, later than the noise signal *f*2 via the pulse amplifier 23, there is no need for a delay circuit in the circuit branch connected to the first input 18 of said gate and second mixer circuit. Furthermore, the gate control pulse supplied to the base of the transistor 43 does not reach the gate and second mixer circuit 19 later than the noise signal. Since the second mixer of the circuit 19 comprises a pair of diodes in balanced connection, the transmission of the signal is blocked at said mixer and said signal is not transmitted further in the radio receiver circuit of FIG. 2.

Although the presence of noise prevents the reproduction of the audio signal by the speaker 35, the circuit is blocked for very short periods of time, so that reproduction of the audio signal by said speaker is practically uninterrupted as far as the listener is concerned, while noise is eliminated effectively and efficiently.

Each amplifier of the radio receiver of FIG. 2 may comprise several amplification stages, if desired, and additional mixers may be utilized.

While the invention has been described by means of a specific example and in a specific embodiment, I do not wish to be limited thereto, for obvious modifications will occur to those skilled in the art without departing from the spirit and scope of the invention.

I claim:

1. In a radio receiver including high frequency and intermediate frequency circuit means for providing from a received radio frequency signal including a noise signal a first intermediate frequency signal including said noise signal, noise frequency circuit means for providing said noise signal from said received radio frequency signal including said noise signal, audio frequency circuit means for reproducing an audio signal from a second intermediate frequency signal and local oscillator means having an output for producing an output signal, a noise elimination circuit connected between said high frequency and first intermediate frequency and noise frequency circuit means and said audio frquency circuit means for producing from said first intermediate frequency signal and supplying to said audio frequency circuit means a second intermediate frequency signal when said noise signal is of zero magnitude and for preventing the supply of a signal to said audio frequency circuit means when said noise signal has a detectable magnitude, said noise elimination circuit comprising mixer means for mixing the output signal of said local oscillator means with said first intermediate frequency signal to produce a second intermediate frequency signal in its operative condition and to produce a zero signal in its inoperative condition and gate means connected to said noise frequency circuit means and cooperating with said mixer means and said local oscillator means for permitting said mixer means to be switched to its inoperative condition when a noise signal of detectable magnitude is supplied to said gate means thereby preventing the supply of a signal to said audio frequency circuit means and for permitting said mixer means to be switched to its operative condition when a noise signal of zero magnitude is supplied to said gate means thereby providing a second intermediate frequency signal to said audio frequency circuit means.

2. In a radio receiver including high frequency and intermediate frequency circuit means for providing from a received radio frequency signal including a noise signal a first intermediate frequency signal including said noise signal, noise frequency circuit means for providing said noise signal from said received radio frequency signal including said noise signal, audio frequency circuit means for reproducing an audio signal from a second intermediate frequency signal and local oscillator means having an output for producing an output signal, a noise elimination circuit connected between said high frequency and first intermediate frequency and noise frequency circuit means and said audio frequency circuit means for producing from said first intermediate frequency signal and supplying to said audio frequency circuit means a second intermediate frequency signal when said noise signal is of zero magnitude and for preventing the supply of a signal to said audio frequency circuit means when said noise signal has a detectable magnitude, said noise elimination circuit comprising mixer means for mixing the output signal of said local oscillator means with said first intermediate frequency signal to produce a second intermediate frequency signal in its operative condition and to produce a zero signal in its inoperative condition, said mixer means comprising a pair of diodes and means connecting said pair of diodes in balanced relation, means connecting the output of said local oscillator means to said mixer means, and gate means connected to said noise frequency circuit means and cooperating with said mixer means and said local oscillator means for permitting said mixer means to be switched to its inoperative condition when a noise signal of detectable magnitude is supplied to said gate means thereby preventing the supply of a signal to said audio frequency circuit means and for permitting said mixer means to be switched to its operative condition when a noise signal of zero magnitude is supplied to said gate means thereby providing a second intermediate frequency signal to said audio frequency circuit means, said gate means comprising electronic switching means having a control electrode connected to said noise frequency circuit means, said electronic switching means being connected in the output of said local oscillator means for preventing the output signal of said local oscillator means from reaching said mixer means when a noise signal of detectable magnitude is supplied to the control electrode of said electronic switching means thereby preventing the supply of a signal to said audio frequency circuit means and for permitting the output signal of said local oscillator means to reach said mixer means when a noise signal of zero magnitude is supplied to the control electrode of said electronic switching means thereby providing a second intermediate frequency signal to said audio frequency circuit means.

3. In a radio receiver including high frequency and intermediate frequency circuit means for providing from a received radio frequency signal including a noise signal a first intermediate frequency signal including said noise signal, noise frequency circuit means for providing said noise signal from said received radio frequency signal including said noise signal, audio frequency circuit means for reproducing an audio signal from a second intermediate frequency signal and local oscillator means having an output for producing an output signal, a noise elimination circuit connected between said high frequency and first intermediate frequency and noise frequency circuit means and said audio frequency circuit means for producing from said first intermediate frequency signal and supplying to said audio frequency circuit means a second intermediate frequency signal when said noise signal is of zero magnitude and for preventing the supply of a signal to said audio frequency circuit means when said noise signal has a detectable magnitude, said noise elimination circuit comprising mixer means for mixing the output signal of said local oscillator means with said first intermediate frequency signal to produce a second intermediate frequency signal in its operative condition and to produce a zero signal in its inoperative condition, said mixer means comprising a pair of diodes connected in balanced circuit relation and biasing means connected to said diodes for biasing said diodes to their non-conducting condition, means connecting the output of said local oscillator means to the diodes of said mixer means, and gate means connected to said noise frequency circuit means and cooperating with said mixer means and said local oscillator means for permitting said mixer means to be switched to its inoperative condition when a noise signal of detectable magnitude is supplied to said gate means thereby preventing the supply of a signal to said audio frequency circuit means and for permitting said mixer means to be switched to its operative condition when a noise signal of zero magnitude is supplied to said gate means thereby providing a second intermedate frequency signal to said audio frequency circuit means, said gate means comprising electronic switching means having a control electrode connected to said noise frequency circuit means, said electronic switching means being connected in the output of said local oscillator means for preventing the output signal of said local oscillator means from reaching the diodes of said mixer means when a noise signal of detectable magnitude is supplied to the control electrode of said electronic switching means thereby maintaining the effect of said biasing means on said diodes and preventing the supply of a signal to said audio frequency circuit means and for permitting the output signal of said local oscillator means to reach the diodes of said mixer means when a noise signal of zero magnitude is supplied to the control electrode of said electronic switching means thereby overcoming the effect of said biasing means on said diodes and biasing said diodes to their conducting condition to provide a second intermediate frequency signal to said audio frequency circuit means.

4. In a radio receiver including high frequency and intermediate frequency circuit means for providing from a received radio frequency signal including a noise signal, a first intermediate frequency signal including said noise signal, noise frequency circuit means for providing said noise signal from said received radio frequency signal including said noise signal, audio frequency circuit means for reproducing an audio signal from a second intermediate frequency signal and local oscillator means having an output for producing an output signal, a noise elimination circuit connected between said high frequency and first intermediate frequency and noise frequency circuit means and said audio frequency circuit means for producing from said first intermediate frequency signal and supplying to said audio frequency circuit means a second intermediate frequency signal when said noise signal is of zero magnitude and for preventing the supply of a signal to said audio frequency circuit means when said noise signal has a detectable magnitude, said noise elimination circuit comprising mixer means for mixing the output signal of said local oscillator means with said first intermediate frequency signal to produce a second intermediate frequency signal in its operative condition and to produce a zero signal in its inoperative condition, said mixer means comprising a pair of diodes connected in balanced circuit relation and biasing means connected to said diodes for biasing said diodes to their non-conducting condition, means connecting the output of said local oscillator means to the diodes of said mixer means, and gate means connected to said noise frequency circuit means and cooperating with said mixer means and said local oscillator means for permitting said mixer means to be switched to its inoperative condition when a noise signal of detectable magnitude is supplied to said gate means thereby preventing the supply of a signal to said audio frequency circuit means and for permitting said mixer means to be switched to its operative condition when a noise signal of zero magnitude is supplied to said gate means thereby providing a second intermediate frequency signal to said audio frequency circuit means, said gate means comprising a transistor having a control electrode connected to said noise frequency circuit means, said transistor being connected in the output of said local oscillator means for preventing the output signal of said local oscillator means from reaching the diodes of said mixer means when a noise signal of detectable magnitude is supplied to the control electrode of said transistor thereby maintaining the effect of said biasing means on said diodes and preventing the supply of a signal to said audio frequency circuit means and for permitting the output signal of said local oscillator means to reach the diodes of said mixer means when a noise signal of zero magnitude is supplied to the control electrode of said transistor thereby overcoming the effect of said biasing means on said diodes and biasing said diodes to their conducting conditions to provide a second intermediate frequency signal to said audio frequency circuit means.

5. A noise elimination circuit in a radio reciever as claimed in claim 4, wherein said transistor of said gate means has a base electrode connected to said noise frequency circuit means, an emitter electrode connected to a point at ground potential and a collector electrode connected to the output of said local oscillator means.

6. A noise elimination circuit in a radio receiver as claimed in claim 5, further comprising a time constant circuit connected in the output of said local oscillator means.

References Cited

UNITED STATES PATENTS 3,056,087 9/1962 Broadhead et al. ---- 325—478

KATHLEEN H. CLAFFY, *Primary Examiner.*

R. LINN, *Assistant Examiner.*